United States Patent [19]

Tochioka

[11] Patent Number: 5,733,985
[45] Date of Patent: Mar. 31, 1998

[54] POLYMER COMPOSITE AND PRODUCTION THEREOF

[75] Inventor: Takahiro Tochioka, Yokohama, Japan

[73] Assignee: Mazda Motor Corporation, Hiroshima-ken, Japan

[21] Appl. No.: 584,699

[22] Filed: Jan. 11, 1996

Related U.S. Application Data

[63] Continuation of Ser. No. 10,710, Jan. 29, 1993, abandoned.

[30] Foreign Application Priority Data

| Jan. 29, 1992 | [JP] | Japan | 4-014036 |
| Sep. 21, 1992 | [JP] | Japan | 4-250953 |
| Dec. 7, 1992 | [JP] | Japan | 4-326550 |

[51] Int. Cl.$^6$ ................................. C08F 283/04
[52] U.S. Cl. ................ 525/420; 525/450; 525/437; 525/535
[58] Field of Search ............... 525/420, 450, 525/437, 535

[56] References Cited

U.S. PATENT DOCUMENTS

| 4,228,218 | 10/1980 | Takayanagi et al. | 525/58 |
| 5,068,292 | 11/1991 | Lenke et al. | 525/509 |
| 5,223,584 | 6/1993 | Lenke et al. | 525/405 |
| 5,223,588 | 6/1993 | Lenke et al. | 525/509 |

FOREIGN PATENT DOCUMENTS

| 0 408 166 | 1/1991 | European Pat. Off. . |
| 0 436 111 | 7/1991 | European Pat. Off. . |
| 2 407 956 | 6/1979 | France . |
| 5500/1986 | 2/1986 | Japan . |
| 61051016 | 3/1986 | Japan . |
| 86-314182 | 10/1986 | WIPO . |
| 89-051349 | 1/1989 | WIPO . |

OTHER PUBLICATIONS

Bryce Maxwell, "Miniature Injection Molder Minimizes Residence Time", Reprinted from SPE Journal, vol. 28, No. 2, Feb. 1972.

Kenkichi Murakami, "Compounding", Research Laboratory of Plastics Technology.

Dr. Tadamoto Sakai (Machinery and Electronic Research Laboratory) and Mitsuaki Mizoguchi et al., (Design and Engineering Department, Hiroshima Plant), "Reactive Processing Using Twin Screw Extruders", JSW Technical Review. No. 14.

D. B. Todd, Stevens Institute of Technology, Polymer Processing Institute, Hoboken, New Jersey, "Melting of Plastics in Kneading Blocks", ANTEC '92.

A. Kiani et al., Werner & Pfleiderer Corporation, Ramsey, N.J., and U. Burkhardt, Werner & Pfleiderer, GErmany, "Modelling of Flow Fields in Distributive Mixing Elements", ANTEC '92.

*Primary Examiner*—Helen Lee
*Attorney, Agent, or Firm*—Morrison & Foerster LLP

[57] ABSTRACT

A polymer composite comprising flexible polymer matrix and rod-shaped reinforcing member finely dispersed therein at the molecular level, wherein the diameter of the section cut in right angle to the longitudinal direction of said rod-shaped reinforcing member is less than 0.07 μ, and a process for producing the same.

15 Claims, 12 Drawing Sheets

POLYMER COMPOSITE AND PRODUCTION THEREOF

This application is a continuation of U.S. application Ser. No. 08/010,710 filed Jan. 29, 1993, now abandoned.

FIELD OF THE INVENTION

The present invention relates to a polymer composite wherein a rigid polymer reinforces a flexible polymer at molecular level, and a process for producing the same.

BACKGROUND OF THE INVENTION

Generally speaking the performance unique to a polymer material is manifested by the high-order structure but such high-order structure is influenced by the primary structure such as molecular weight, distribution of molecular weight, degree of crystallization, degree of orientation etc., especially it depends largely on the molecular structure. Therefore as the method to overcome the limit of dynamic characteristics which naturally exists, macro-fiber-reinforced composite material has been used before.

The filament-like fiber of high elasticity and high strength to be used for macro-fiber-reinforced composite may be carbon fiber, glass fiber, aramid fiber, etc. However, these fibers are usually the aggregation of fibril and microfibril and contain defects at various points which become the cause of generation of microcracks. For example, should the terminal of molecular chain, terminal of microfibril or terminal of each fiber which constitute the propagation route of a breaking crack as shown in FIG. 1 receive an external force, the stress on such terminals shall be higher than the average stress, in other words it becomes the cause of a stress concentration. Besides, since the diameter of the filament is about 10 m, in order to uniformly distribute the external stress to the oriented fibers and exploit the limiting performance of the fiber, the adhesive force of the fiber and the matrix interface must be sufficiently large. As regards the problems of structural defects of macro-fiber and adhesion of the interface, by thinning the diameter of the fiber, the possibility of propagation of a fatal defect is reduced and thus the strength increases. In other words, by reducing the diameter of the fiber, local concentration of the stress may be avoided. As the aspect ratio L/D (L and D are respectively the length and diameter of the reinforcing fiber) becomes large, contact surface increases and the problem of poor adhesion of matrix molecule to the interface is lessened. The ultimate method of such improvement is to blend a rigid polymer. By making the molecular diameter of such rigid polymer equal to D, the critical aspect ratio is easily achieved and breaking occurs only when the covalent bonding of the molecular chain breaks. As far as the adhesion of the reinforcing molecule to the matrix molecule at the interface is sufficient, the theoretical strength of the molecule shall be manifested. The effectiveness of the structure of the rigid molecule in increasing the strength of the composite is derived not only from the rigidity of the specific molecular structure but also from the strength of such molecular chain in the direction of the chain as far as such molecular chain is not folded in the generating crystal.

Usually, those taking the folded chain structure produce a defect at the folded point. Besides, since its amorphous part contains a lower number of covalent bonds in the unit sectional area, such an amorphous part becomes the propagation route of cracks and therefore the rigid polymer is profitable in manifesting strength in such respect also.

Consequently, when the molecular chain of the reinforced polymer has the rigidity higher than certain limit and if such reinforcing substance is uniformly dispersed in the matrix polymer in microscopic level, with addition of only a small amount of reinforcing polymer, it is possible to improve various dynamic properties of the composite without accompanying actual deterioration of its processability.

So far, based on such consideration, the concept of polymer composite has been advocated as described in the Japanese Kokoku Publication Sho 61-5500 or published Japanese patent Sho 55-500440. These conventional polymer composite have been basically manufactured by the method to uniformly mix the two polymers using solvent but to disperse and mix these polymers in an extremely uniform state, many difficulties exist under the present technical level and in many cases the diameter of the reinforcing member (lump of rigid polymer) exceeds several. Besides the use of solvent is indispensable and consequently the process has the problem that the polymer having no solubility in the solvent can not be used. In addition, the use of solvent is presently subject to legal restriction in many aspects and basically the manufacturing method using no solvent is preferred.

SUMMARY OF THE INVENTION

The objective of the present invention is to provide a process for producing a polymer composite wherein no solvent is used and the reinforcing member (rigid polymer) may be uniformly dispersed at a molecular level in the soft matrix resin.

The present invention provides a polymer composite comprising a flexible polymer matrix and a rod-shaped reinforcing member finely dispersed therein at a molecular level, wherein the diameter of the section cut in right angle to the longitudinal direction of said rod-shaped reinforcing member is less than 0.07 µ.

The present invention also provide a process for producing a polymer composite composed of a flexible polymer matrix and a rod-shaped reinforcing member finely dispersed therein at a molecular level, comprising polymerizing a monomer for forming a rigid polymer without solvent in a melting mixture of said monomer with said flexible polymer.

DETAILED DESCRIPTION OF THE INVENTION

According to the present invention, the polymer is classified into two kinds, namely, flexible polymer and rigid polymer. What is meant by "rigid" in the present invention is that the bonding which constitutes the polymer chain is strong, sectional area occupied by the polymer chain is small and the polymer chain is composed of the molecular structure which is subject to little extension. As far as the characteristics which fall under the definition, it may be called rigid but to express it more concretely, it may be expressed by two factors, namely, the theoretical crystal elastic modulus Ec and theoretical strength at breaking σb. The theoretical crystal elastic modulus Ec and theoretical strength σbc be may be defined as follows:

How to obtain theoretical value of crystal modulus of elasticity Ec and theoretical strength σbc at breaking.

First the discussions shall be made on one polymer chain. Force F is applied to the polymer chain with sectional area S and length L. When the polymer chain elongates by ΔL (=L−Lo), tensile modulus of elasticity E is, $$E = \sigma n/\epsilon n = (F/S)/(\Delta L/L) \qquad (1)$$

(In the formula, E is tensile modulus of elasticity, σn is tensile stress (n=F/S) and σn is elongation distortion and σn represents ΔL/L).

gives serious influence on the dynamic characteristic of the polymer.

TABLE 1

Theoretical value and attained value of strength and elasticity of polymer material

| Construction of molecules | Polymer | Sectional area S (nm$^2$) | Tensile modulus of elasticity (GPa) | | Tensile strength (GPa) | |
|---|---|---|---|---|---|---|
| | | | Theoretical value Ec | Attained value Es | Theoretical value σbc | Attained value σbn |
| Flat zigzag chain structure | Polyethylene | 0.182 | 316 | 232 | 31 | 6.0 |
| | Polyvinyl alcohol | 0.216 | 287 | 87 | 26 | 2.1 |
| | Polyethylene terephthalate | 0.204 | 122 | 21 | 28 | 0.9 |
| | Nylon-6 | 0.177 | 244 | 16 | 32 | 1.0 |
| | Poly(m-phenylene-isophthalamide) | 0.238 | 90 | 10 | — | — |
| | Poly(p-phenylene-terephthalamide) | 0.202 | 182 | 131 | — | 3.9 |
| | Poly(p-benzamide) | 0.198 | 163 | 128 | — | — |
| Spiral structure | Polypropylene | 0.344 | 49 | — | 17 | — |
| | Polystyrene | 0.692 | — | — | 9 | — |
| | Polyoxymethylene | 0.172 | 81 | — | — | — |
| Rod structure | Poly(p-phenylene) | 0.234 | 275 | — | — | — |
| | Poly(p-phenylene-pyromeritimide) | 0.242 | 505 | — | — | — |
| | Poly(p-phenylene-benzobisthiazole) | 0.215 | 371 | 320 | — | 3.1 |

Theoretical strength b at breaking time is, $$\sigma b = F_{max}/S = (K_1 D/8)^{1/2}/S \quad (2)$$

(In the formula, F max is the maximum value of stress and D represents bonding energy)

Next the polymer crystal shall be discussed. The crystal structure is in the state that the molecular chain is three-dimensionally arranged regularly and as dense as possible and in the form that long rod-shaped molecules are bundled. Therefore formula (1) and (2) also apply to the crystals.

Table 1 shows the results of calculation of theoretical value of crystal modulus of elasticity Ec by formula (1) based on the lattice dynamic method.

Theoretical value of tensile strength bc of polymer crystal can σbc calculated from formula (2) but it may be calculated more conveniently by formula (3) given below.

$$\sigma bc = (5.68 \times 10^{-4})/S \quad (3)$$

Generally speaking when a certain force is applied to the polymer chain, stress concentrates on the bonded part which is weakest in the main chain and breaking occurs at such point. The weakest bond of all the bonds of the main chain constituting the polymer, that is, the bond which has the lowest covalent bonding energy is C—C bond.

Therefore, when the polymer containing C—C bond is pulled, the polymer chain breaks at such point and therefore from the breaking energy of C—C bond (D-83 Kcal/mol), the formula (3) is derived.

Theoretical strength σbc obtained from formula (3) is also shown in Table 1.

Table 1 also indicates the fibrous modulus of elasticity of each polymer so far obtained. Here, a difference exists between the actual fibrous modulus of elasticity and the strength (i.e., the achieved value) and theoretical value. It is because the actual polymer is composed of crystalline structure and amorphous structure and amorphous structure When tensile modulus of elasticity of sample polymer composed of crystalline structure and amorphous structure is Es, modulus of elasticity of crystalline phase is Ec, that of amorphous phase is Ea and degree of crystallinity is Xc and then a serial dynamic model may be as follows:

$$1/Es = Xc/Ec + (1-Xc)/Ea \quad (4)$$

Generally speaking Es>>Ea and therefore formula (4) may be simplified as $$Es = Ea/(1-Xc)$$

It shows that the modulus of elasticity of the sample polymer is mostly determined by the amorphous phase and the influence of the presence of amorphous phase to the dynamic physical property is large and the presence of amorphous phase hinders the attainment of theoretical strength. The flexible polymer such as polyethylene telephthalate, nylon-6 and poly (m-phenylene isophthalamide) which has non-linear structure has the folded polymer chain and it is difficult for them to take the fully extended chain structure and thus the attainment of theoretical value is hindered. However, as for polyethylene which is essentially a flexible polymer, it is possible to make the polymer chain fully extended if it is manufactured by the fibrous crystal growth method or gel spinning super-elongation method etc. and thereby the degree of attainment as shown in Table 1 can be achieved.

As for poly (p-phenylene telephthalamide), poly (p-benzamide) and poly (p-phenylene benzobisthiazol) (with fully extended straight chain structure) which belong to high strength high elasticity polymer, the degree of attainment of theoretical modulus of elasticity is sufficiently large but the degree of attainment of strength is small being around 10 percent. That means, various high molecular defects of the polymer are not eliminated and due to such defect, concentration of stress occurs to cause breaking. As for these polymers, not only from the viewpoint of molecular structure but also for physical processing method, study is being continued in order to eliminate said defects and bring the strength as close as possible to the theoretical value.

As aforesaid, theoretical values are the values obtained from the ideal structure of polymer crystals, namely, fully extended chain and flawless construction. The rigid polymers used in the present patent are those having a high theoretical value and even in the present stage, sufficiently high degree of attainment is realized. This is because the rigidity of their molecular chain is contributing to the materialization of such characteristics.

Based on such findings, when the .dynamic physical characteristics of rigid polymer of the present invention are analyzed by the currently available information, the theoretical crystalline elasticity modulus, theoretical strength and the attained value of tensile elastic modulus and tensile strength of the actual fiber are as follows:

TABLE 2

| Theoretical value | Attained value |
| --- | --- |
| Theoretical crystalline elastic modulus [GPa] over 150 | Tensile elasticity modulus [Gpa] over 100 |
| Theoretical strength [GPa] over 2.0 | Tensile strength [Gpa] over 2.0 |

An example of the polymer which utilizes the physical conditions of rigid polymer as aforesaid, may be the polymer having repetitive unit structure as shown as follow:

—Ar (X)$_n$ Ar'— in the formula, Ar indicates,

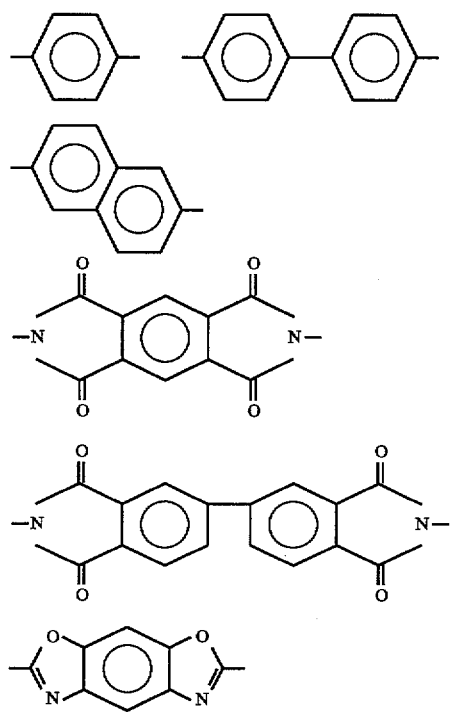

or
Ar' indicates

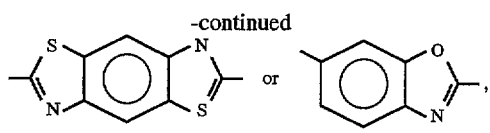

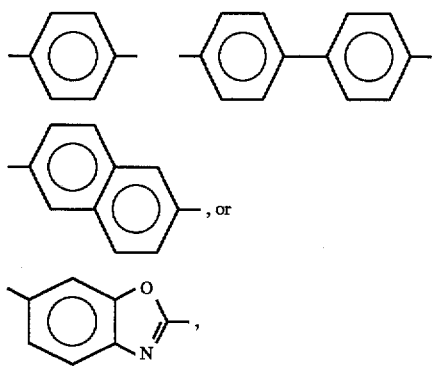

or

X indicates —CH=N—, —COO—, —N=N(O)—, —CONH—,
—N=N—, —C=C—, or —CH=CH—
and n indicates 0 or 1

In the formula, all benzene rings may have a substitution group for example alkyl group, halogen, etc. The concrete examples of rigid polymer to be represented by such chemical formula may be poly(p-oxybenzoyl), poly(p-benzamide), poly (p-phenylene telephthalamide), polyazomethyne, poly(p-phenylene pyromeritimide), polybenzobisoxazol, polybenzobisthiazol, polybenzobisthiazol, polybenzoxazol, etc.

The flexible polymer used in the present invention is a general polymer not in the category of the aforesaid rigid polymer. It may be engineering plastics such as nylon 6, nylon 66, polyether sulfon, polysulfon, polycarbonate, polybutylene telephthalate or multipurpose plastics.

Polymer composite of the present invention is required to contain the rigid polymer (corresponding to the rod-shaped reinforcing member) finely dispersed at a molecular level and the diameter of the section cut in right angle to the longitudinal direction is required to be less than 0.07 μ. The diameter of the section of rod-shaped reinforcing member means the diameter of the section cut in the longitudinal direction at the part where rigid polymer granules in the composite are gathering (the part where rod-shaped rigid polymers are gathering densely in the matrix of flexible polymer), the area of such cut section being converted into a circle with a core.

In order that the diameter of the section cut in a right angle to the longitudinal direction of rod-shaped reinforcing member (rigid polymer part) as aforesaid is less than 0.7 μ, it is necessary to use the manufacturing method specific to the present invention. Of course, if it could be obtained without relying on such method, the effect of the present invention may be sufficiently satisfied.

The method of the present invention is characterized by polymerizing the flexible polymer and the monomer to form a rigid polymer in the solvent-free melt-kneading state. The flexible polymer is as aforesaid but the characteristic feature of the present invention is that the monomer for forming rigid polymer is mixed with said polymer. The concrete example of the monomer to form the rigid polymer may be, for example, p-acetoxybenzoic acid, p-hydroxybenzoic chloride, phenyl p-hydroxy-benzoate etc. when the polymer is poly(p-oxybenzoyl) and p-acetoaminobenzoic acid, p-aminobenzoic chloride etc. when the polymer is poly(p-benzamide).

In the present invention, it is required to conduct polymerization in the solvent-free, melt-knead state. To be more concrete, the flexible polymer and the monomer to form rigid polymer are melted and by kneaded a double axis extruder etc. and, for example, in the case of p-acetoxybenzoic acid, the temperature is raised to over 200°–350° C. to promote polymerization. If no solvent is used, polymerization may be done without using an extruder.

Polymerization is conducted preferably under a shearing force. Shearing force may be expressed by shear fluidity in particular by shear rate. According to this invention, it is preferred that at the time of polymerization, a shear rate of 2.0–2.5 sec$^{-1}$ preferably 2.0–15 sec$^{-1}$ is applied. Shear rate used here is the apparent maximum shear rate calculated by the following equations (1), (2) assuming Newtonian viscous material, from the rotation frequency measured by the rotor type miniature kneading equipment.

(Cornelder EK-3-50; Toyo Seimitsu Kogyo K. K.)

$$\delta = 2\pi r \omega / G$$

$$V = \pi r^2 G$$

($\delta$=shear rate, r=radius, $\omega$=angular velocity, V=volume, G=height of kneading vessel; these are illustrated in FIG. 2) Shearing force is necessary to finely disperse the rigid polymer at the molecular level. By controlling such shearing force, diameter and axial ratio of the rod-shaped rigid polymer (reinforcing phase) can be controlled. As a result, the dynamic characteristic derived from the fine structure of the rigid polymer particularly its high tensile strength and high impact resistance are obtained.

The compounding ratio of the flexible polymer and the monomer may be, for example, 5–20 wt parts or preferably 8–15 wt parts of monomer as against 100 parts of flexible polymer when the monomer is p-acetoxybenzoic acid. When the monomer content exceeds 20 wt parts, the diameter of the section cut in right angle to the longitudinal direction of rigid polymer becomes over 0.07 μ and it is not compatible with the objective of the present invention to provide toughness. When it is less than 5 wt parts, the effect of the presence of rigid polymer is lost.

At the time of melt-kneading, additive or polymerization initiator may be compounded upon necessity.

According to the present invention, it is possible to effectively increase the modulus of elasticity and strength of the polymer by compounding a small amount of rigid polymer. Besides, by manufacturing the polymer according to the method of the present invention, polymerization may be conducted in the melt-knead state without using the solvent, thus the polymer gains an extremely high fine dispersion characteristics at the molecular level. Consequently, it is not the required condition for the polymer, that the polymer has compatibility with the solvent to be used and thus the range of application widens greatly. Besides, by changing the shear rate at the time of polymerization, dynamic characteristic of the polymer may be greatly improved.

EXAMPLES

The present invention shall be described in further detail according to the Example. However, the present invention is not limited to these Examples.

Example 1

1.80 g of polyether sulfon and 0.2 g of p-acetoxybenzoic acid (90/10 by weight ratio) were knead by MINI-MAX Molder CS-183 MMX, Custom Scientific Instruments Inc. at 250° C. for 5 min. to uniformly blend the two. The temperature of the blended material was gradually raised to 240° C.–320° C. taking about 3 hours in the polymerization tube in which $N_2$ gas flowed to polymerize p-acetoxybenzoic acid. Thus polymerized polyether sulfon/poly(p-oxybenzoyl) (90/10 by weight ratio) composite was again kneaded by miniature injection molding machine and injection-molded by test piece metal mold to obtain the sample for the tensile test.

Injection molding conditions were resin temperature of 340° C. and metal mold temperature of 170° C.

Example 2

1.90 g of polyether sulfon and 0.1 g of p-acetoxybenzoic acid (95/5 by weight ratio) were knead by miniature injection molding machine at 260° C. for 5 min. to uniformly blend the two. The temperature of thus blended material was gradually raised to 240° C.–320° C. taking about 3 hours in the polymerization tube in which $N_2$ gas flowed to polymerize p-acetoxybenzoic acid. Thus obtained polyether sulfon/poly(p-oxybenzoyl) (95/5 by weight ratio) composite was again kneaded by a miniature injection molding machine and injection-molded in the test piece metal mold to obtain the sample for the tensile test.

Injection molding conditions were resin temperature of 340° .C and metal mold temperature of 170° C.

Using thus obtained sample for tensile test, tensile strength test was conducted according to the following method.

Tensile tester (MINI-MAX Tensile Tester CS-183TE, Custom Scientific Instruments Inc.)

Tensile speed was 0.566 cm/min.

Figure 1:
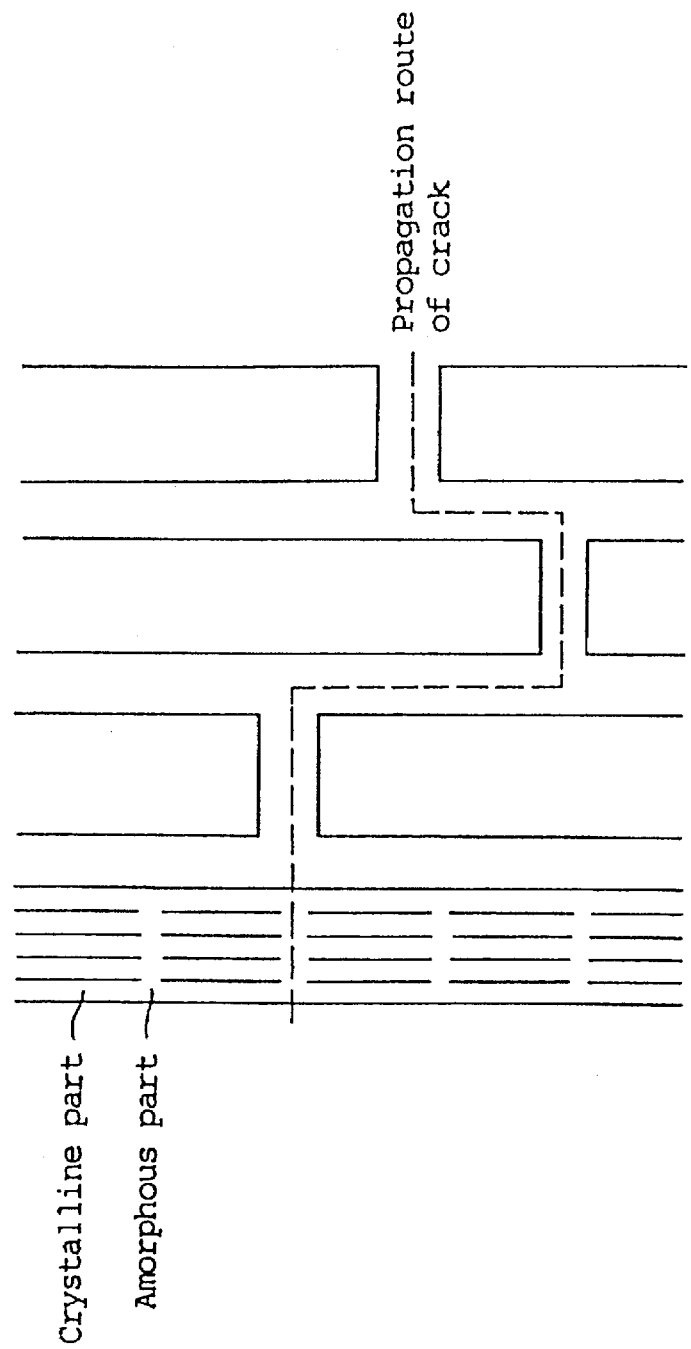
FIG. 1 is a drawing to schematically indicate crack propagation route of macro fiber reinforced composite.
Figure 2:
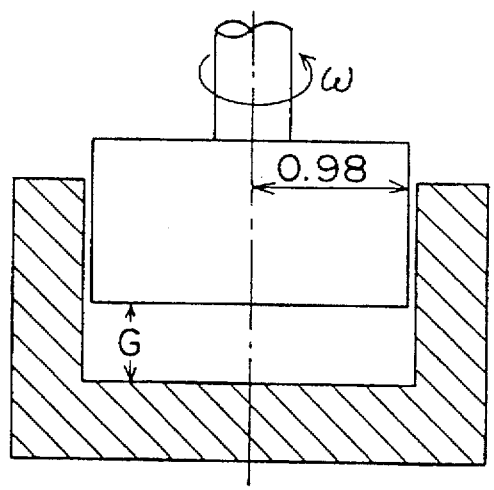
FIG. 2 is a sectional drawing of a reactor vessel of the equipment to measure the shear rate.
Figure 3:
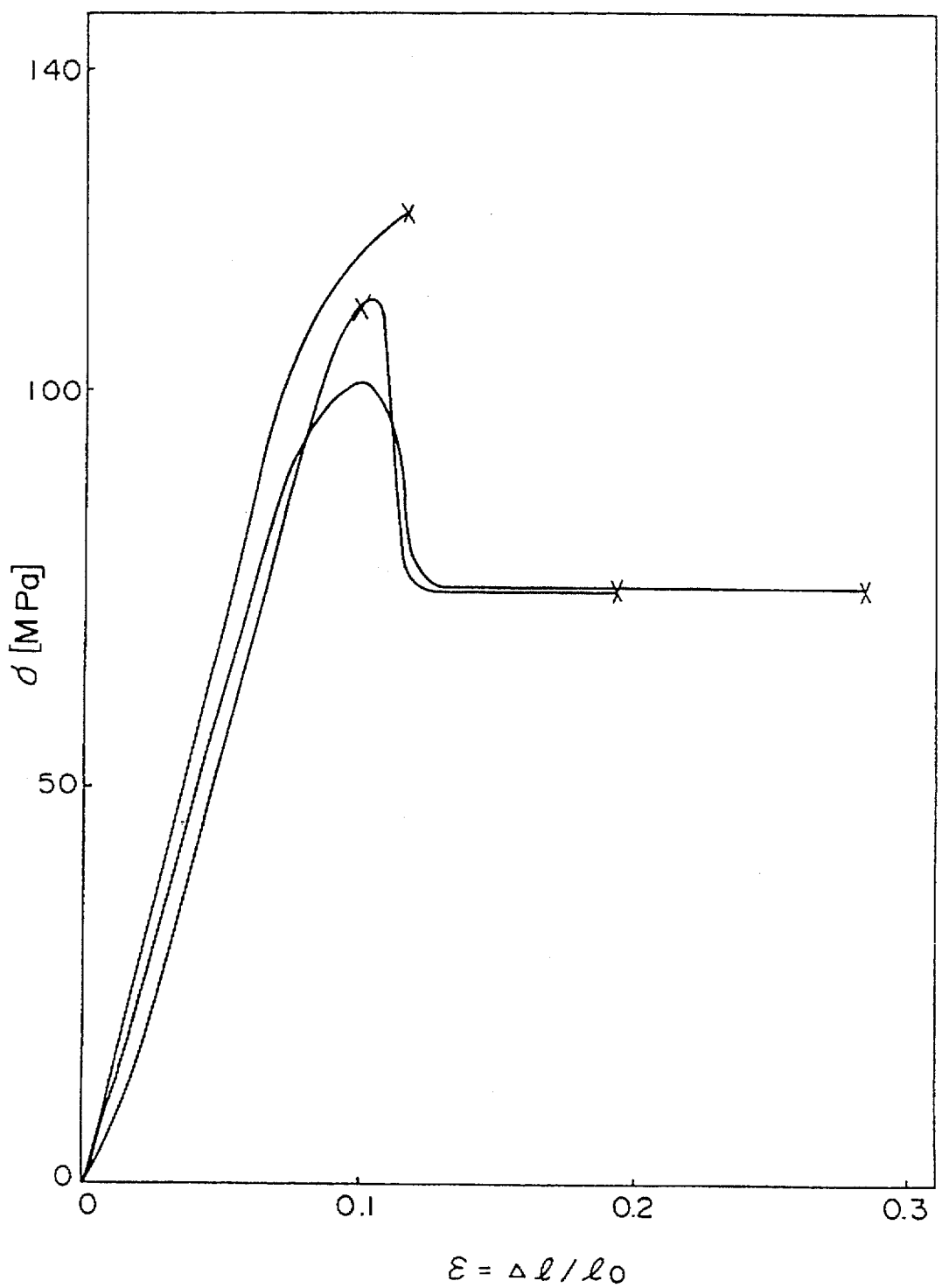
FIG. 3 is a graph which indicates the results of tensile strength test obtained in the examples of the present invention.

Distance between marked lines of test sample L was 0.9 cm, diameter D was 0.1587 cm, rate of strain was 0.629/min. and measuring temperature was RT. The results are shown FIG. 3.

Example 3

Experiment was conducted using polyether sulfon as flexible polymer and poly(p-oxybenzoyl) was used as rigid polymer to be compounded.

As the monomer to produce poly(p.-oxybenzoyl), p-acetoxybenzoic acid was used.

1.26 g of polyether sulfon and 0.14 g of p-acetoxybenzoic acid (90/10 by weight ratio) were kneaded by MINI-MAX Molder CS-183 MMX, Custom Scientific Instruments Inc. at 240° C. for 4 min. to uniformly blend the two. The process was repeated to prepare the blended material of the amount sufficient for the subsequent experiment.

In order to conduct the melt-kneading polymerization at a different shear rate, rotor type miniature kneading machine with which rotation frequency can be regulated (Coanelder, EK-3-5C, Toyo Seimitsu Kogyo K. K.) was used.

2.5 g of blended sample was charged into the miniature kneading machine and was knead at 290°–300° C. for 10 min. to cause reaction. Rotation frequency was changed and the composite member with a different shear rate was obtained.

The fine construction of thus obtained composite member was indicated by the number average of the measured diameter of micro-fiber and fiber length including axial ratio, based on the photographs (×20,000 and×100,000) obtained by transmission type electron microscope (HITACHI H-300, made by Hitachi Ltd.).

Measuring of the physical properties were made by molding the composite member by miniature injection-molding machine into a dumbbell shape (for tensile test) and the shape for Izod impact test without notch (for impact test) at resin temperature of 310° C. and metal mold temperature of 180° C.

Tensile test was conducted by the same method as in Example 2.

For Izod impact test without notch, the MINI-MAX Impact Tester, CS-183 TI-053 was used. The dimensions of the test piece was 3.1×3.2×25.0 mm and temperature was 23° C.

Figure 4:
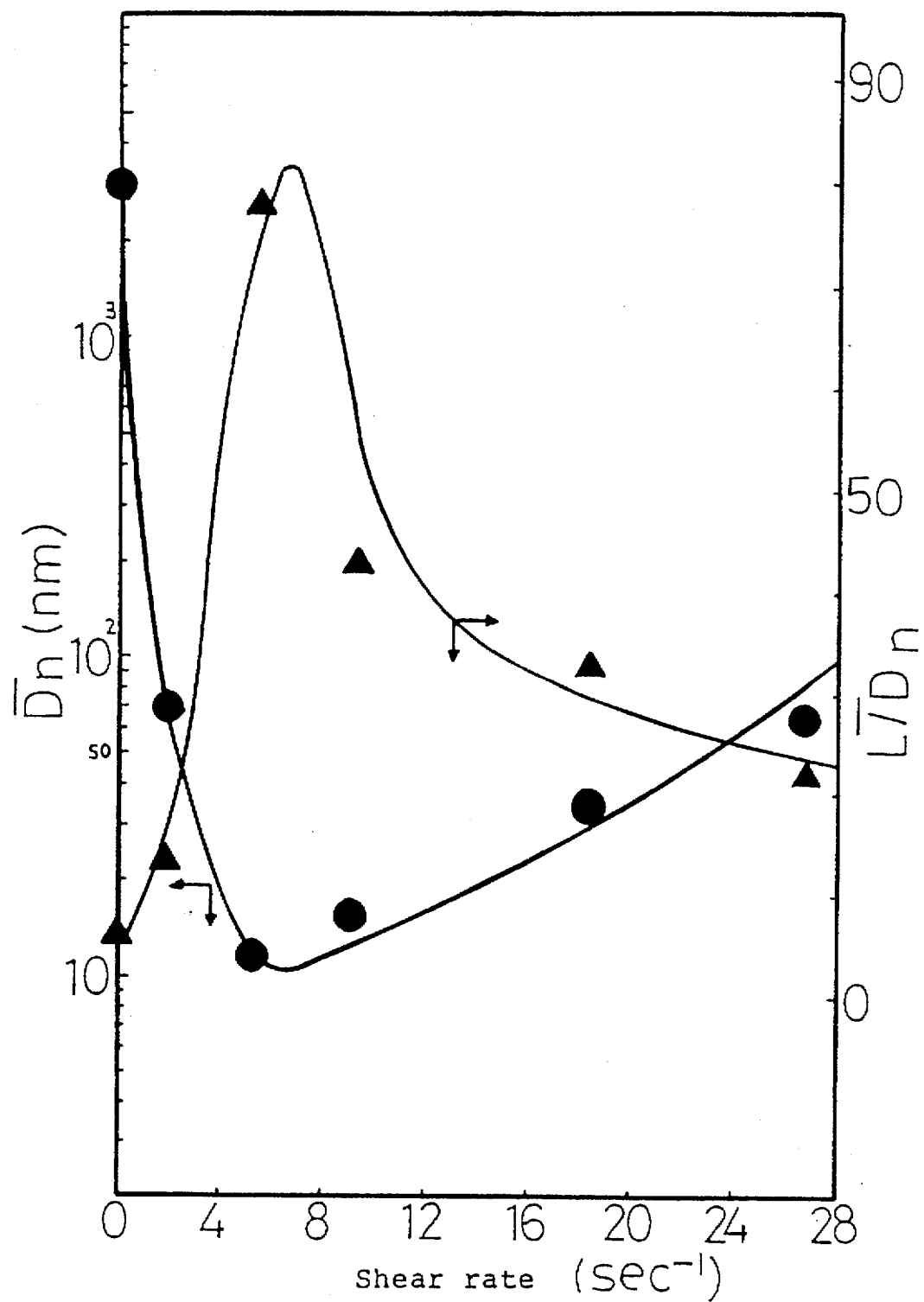
FIG. 4 is a drawing to indicate the shear rate dependence of number average diameter Dn and number average axial ratio L/Dn of a rigid polymer micro fiber.
Figure 5:
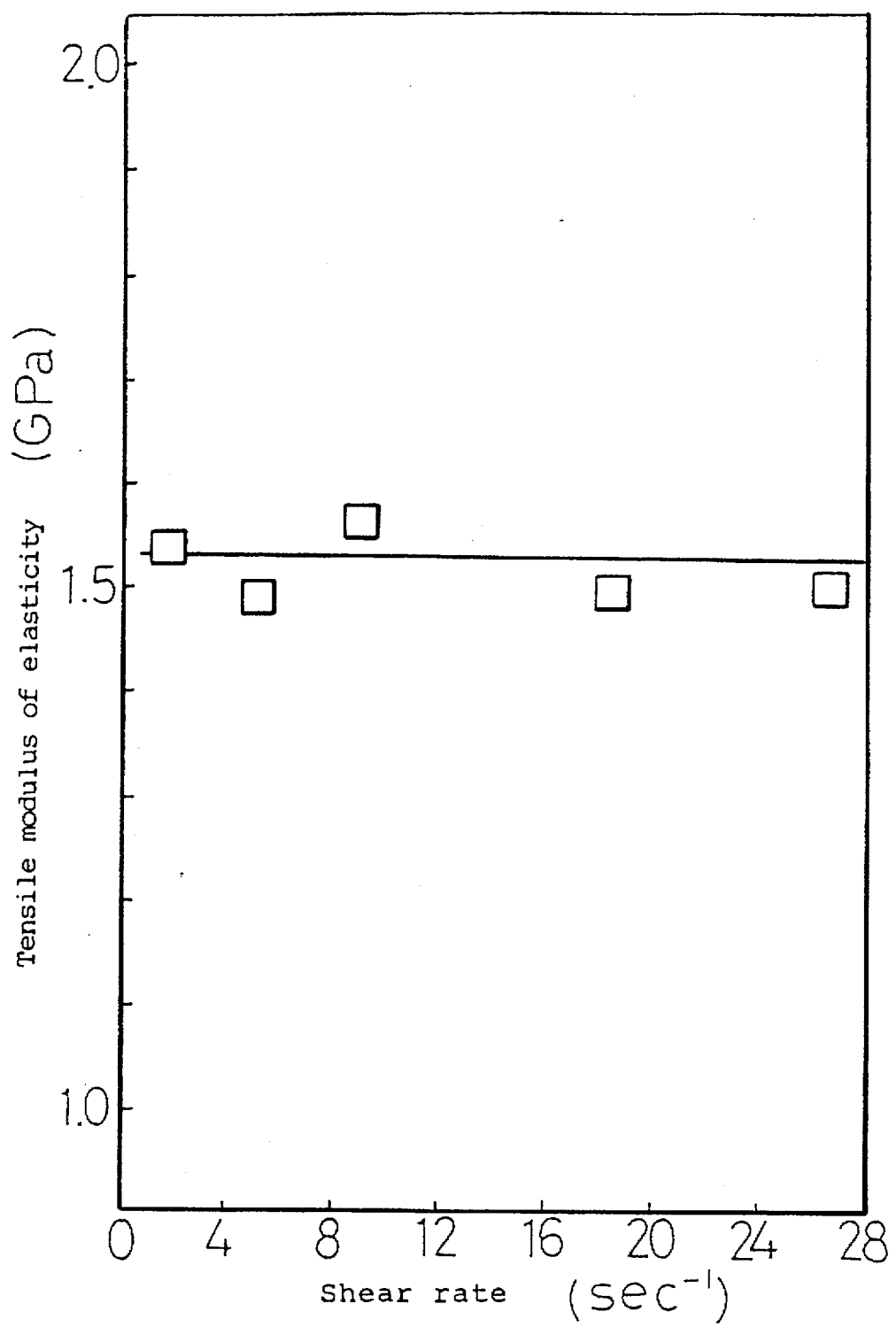
FIG. 5 is a drawing to show the shear rate dependence of on tensile modulus of elasticity.
Figure 6:
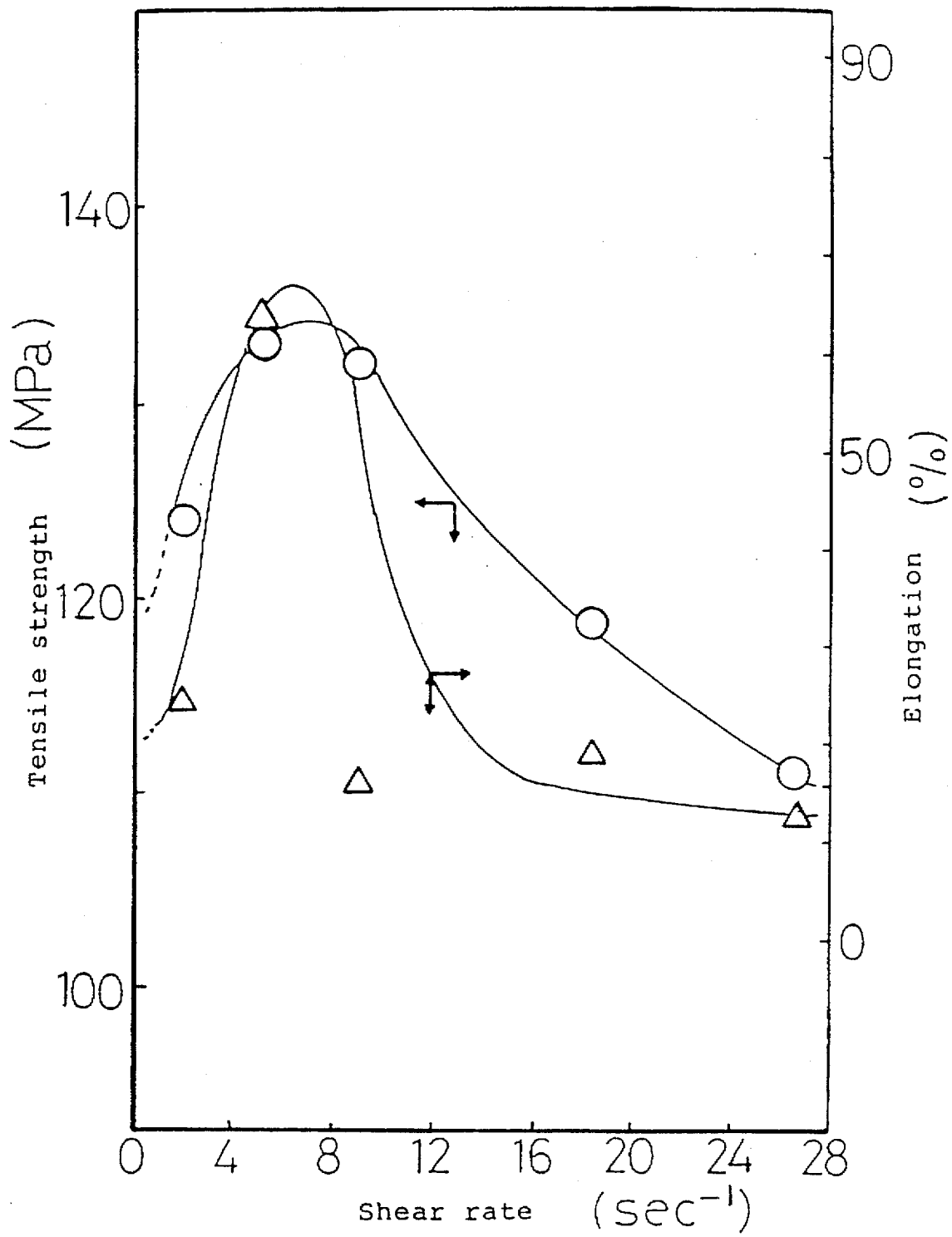
FIG. 6 is a drawing to show the shear rate dependence of on tensile strength and elongation.
Figure 7:
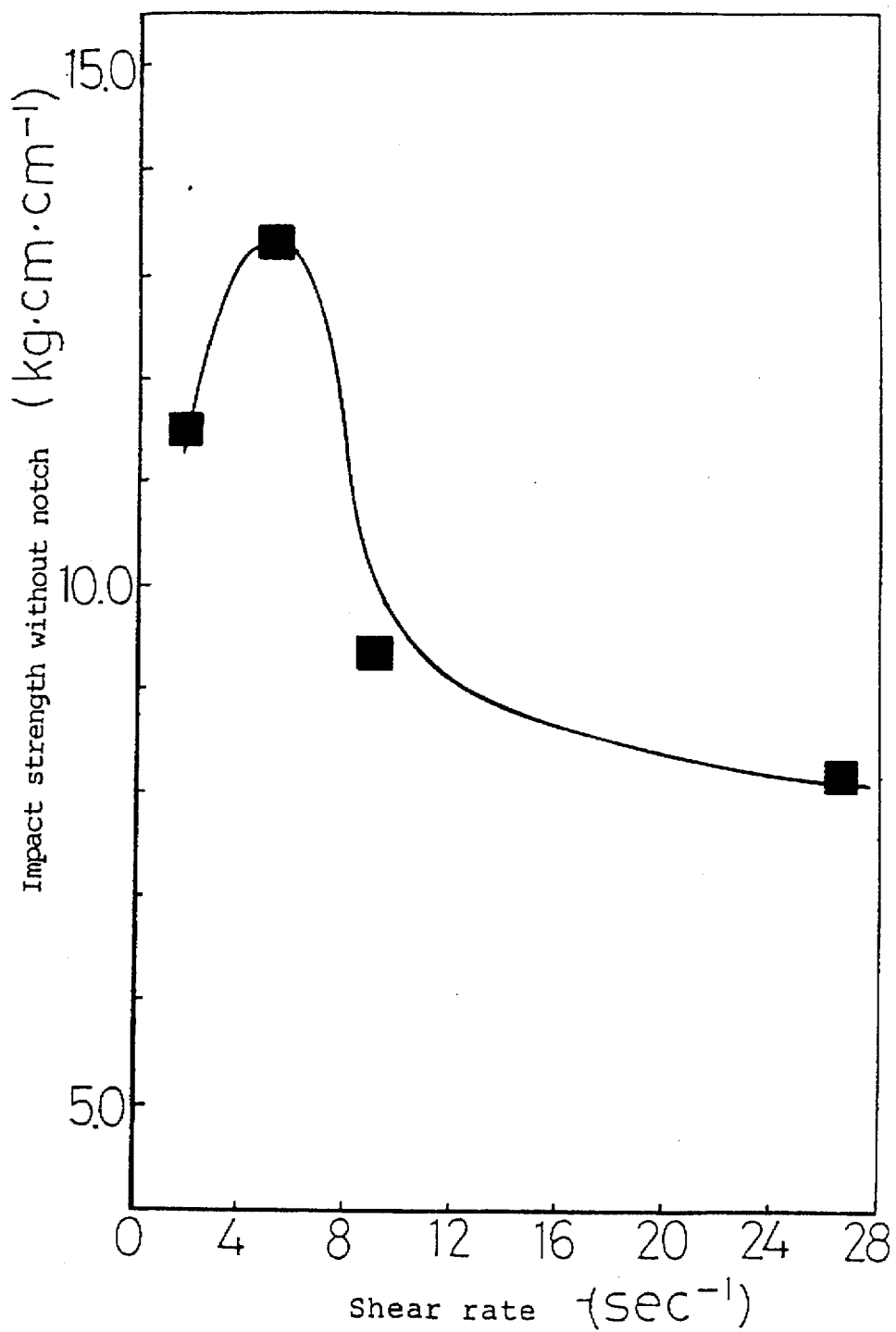
FIG. 7 is a drawing to show the shear rate dependence on Izod impact strength without notch.

Based on the above measurement, the shear rate dependence of the number average diameter Dn and number average axial ratio L/D of rigid polymer micro fiber is shown in FIG. 4. FIG. 5 indicates the shear rate dependence of tensile elastic modulus. FIG. 6 indicates the shear rate dependence of tensile strength and elongation. FIG. 7 indicates the shear rate dependence of Izod impact value without notch.

As it is evident from the above drawing, a large interdependence was noticed between the shear rate and various physical characteristics. Particularly, from around the shear rate of 2.0 sec$^{-1}$, reinforcing effect radically increases and it becomes maximum at around 8.0 sec$^{-1}$ and thereafter the effect gradually decreases but it still maintains still the higher reinforcing effect than at the start.

Example 4

Poly(p-benzamide) was used as rigid polymer and p-acetoaminobenzoic acid was used as the monomer to give rigidity. Polyether sulfon was used as flexible polymer and experiment was conducted. Similar experiment was also conducted by selecting p-acetoxybenzoic acid/polyether sulfon mixture. P-acetoxybenzoic acid had polymerized to become poly(p-oxybenzoyl)

Experiment to make the system finer and enlarge the effective composition range:

Polyether sulfon/p-acetaminobenzoic acid (gross weight 1.40 g) was Kneaded by MINI-MAX Molder CS-183 MMX, Custom Scientific Instrument Inc.) at 240° C. for 4 min. to uniformly blend the two. By repeating such process, blended samples with weight ratio of the two components of 80/20, 83/17, 85/15, 87/13, 90/10, 93/7 and 95/5 were prepared.

Figure 8:
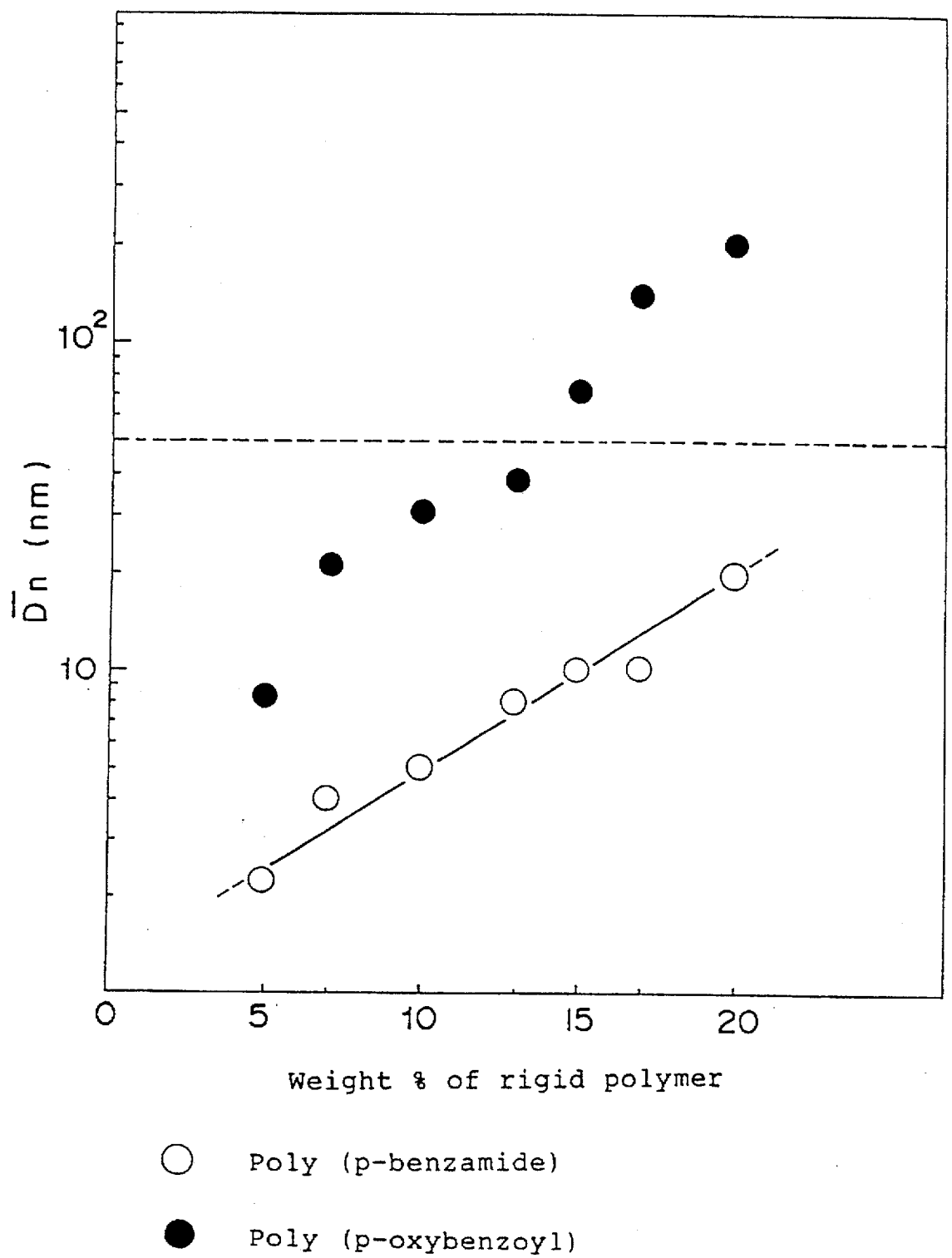
FIG. 8 is a graph to show the composition dependence of number average diameter Dn of rigid polymer micro fiber of Example 4.

Subsequently, using the same miniature injection molding machine, melt-kneading reaction was conducted at 260° C. for 30 min. to prepare polyether sulfon/poly (p-benzamide) composite. By the similar method of preparation, polyether sulfon/poly(p-oxybenzoyl) composite with different composition was prepared. Based on the photograph (×20,000 and×100,000) of the fine construction of the obtained composite, taken by the transmission type electron microscope (HITACHI H-300, Hitachi Ltd.) the diameter of the micro fiber was measured and it was indicated by number average. FIG. 8 shows the fiber diameter at various composition ratios.

Physical property comparison experiment 1.33 g of polyether sulfon and 0.07 g p-acetoaminobenzoic acid (weight ratio 95/5) were uniformly mixed by miniature injection molding machine at 280° C. and temperature was raised to 300° C. and melt-kneading reaction was conducted for 10 min. to obtain polyether sulfon/poly(p-benzamide) (95/5) composite.

Figure 9:
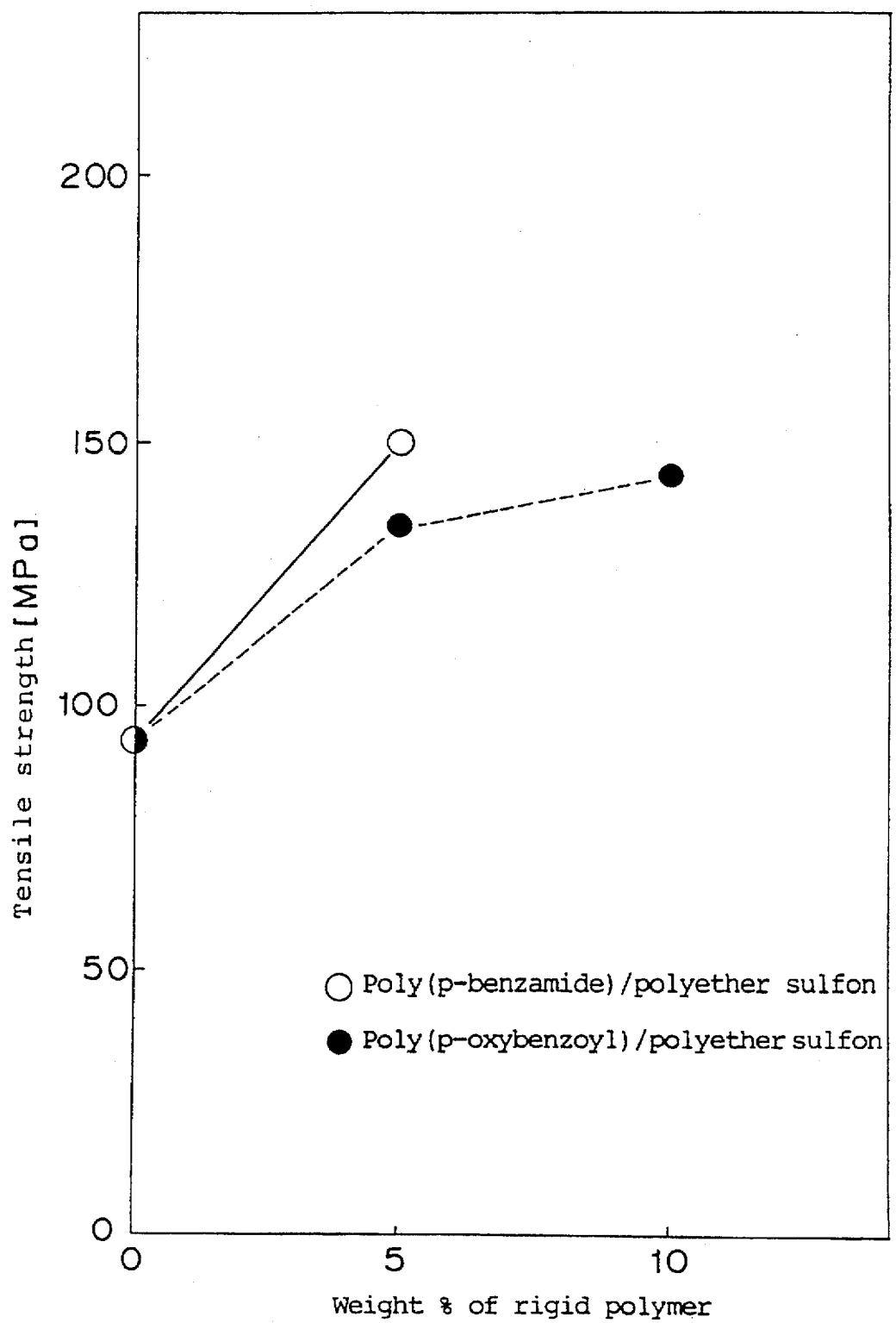
FIG. 9 is a graph to show the composition dependence of the tensile strength of rigid polymer composite of Example 4.
Figure 10:
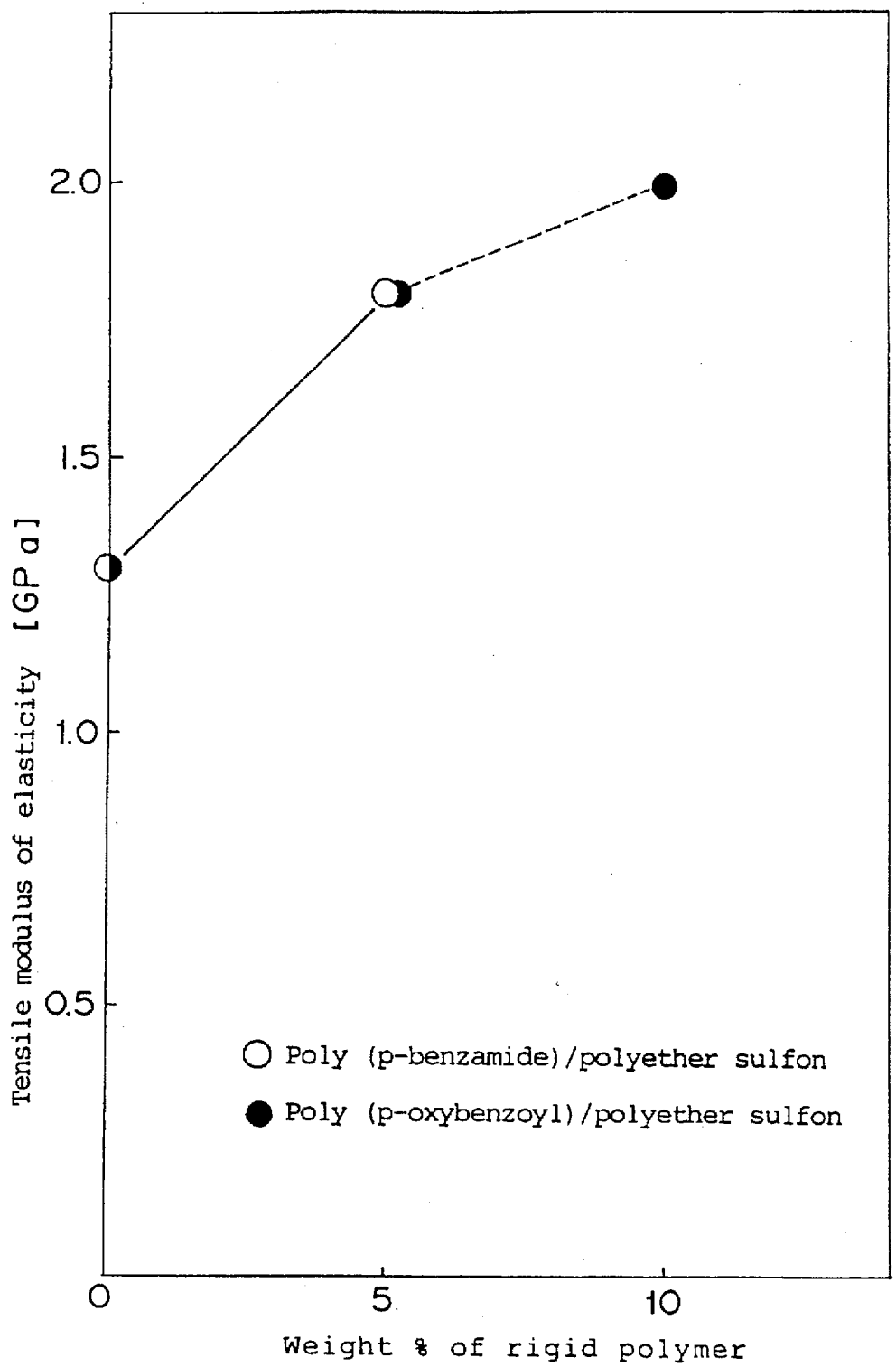
FIG. 10 is a graph to show the composition dependence of for tensile modulus of elasticity of rigid polymer composite of Example 4.

For comparison, 1.33 g of polyether sulfon and 0.07 g of p-acetoxy benzoic acid (95/5 by weight ratio) by the similar miniature injection molding machine at 240° C. for 4 min. and after uniformly blending them, melt kneading reaction was conducted at 300° C. for 10 min. to prepare polyether sulfon/poly(p-oxybenzoyl) (95/5) composite. Separately from 1.26 g of polyether sulfon and 0.14 g of p-acetoxybenzoic acid (90/10 by weight ratio), polyether sulfon/poly(p-oxybenzoyl) (90/10) composite was prepared under the same preparation conditions. Tensile test was conducted on both samples and the tensile strength and tensile modulus of elasticity of the composite of rigid polymer are indicated respectively in FIG. 9 and FIG. 10.

The composite was molded by miniature injection molding machine at resin temperature of 310° C. and metal mold temperature of 180° C. into a round dumbbell shape test piece for tensile test and physical properties were measured.

Tensile test was conducted by the same method as in Example 2.

As it is evident from the above results, micro fiber diameter was made finer and as the result, the effective composition range to give fiber diameter of less than 0.05 μ has expanded. Addition of even 5% of rigid polymer brings about drastic improvement of dynamic physical property.

Example 5

1.33 g of polysulfon and 0.07 g of p-acetoxybenzoic acid (95/5 by weight ratio) were Kneaded by miniature kneading reactor (Coanelder EK-3-5C, manufactured by Tobuchi Seimitsu Kogyo K. K.) at 250° C. for 4 min. to uniformly blend the two. Subsequently, using the same miniature kneading reactor, melt-kneading reaction was conducted at 290° C. for 10 min. to prepare the polysulfon/poly(p-oxybenzoyl) (95/5) composite. By the a similar method of preparation, polysulfon/poly(p-oxybenzoyl) (90/10) composite was prepared.

Figure 11:
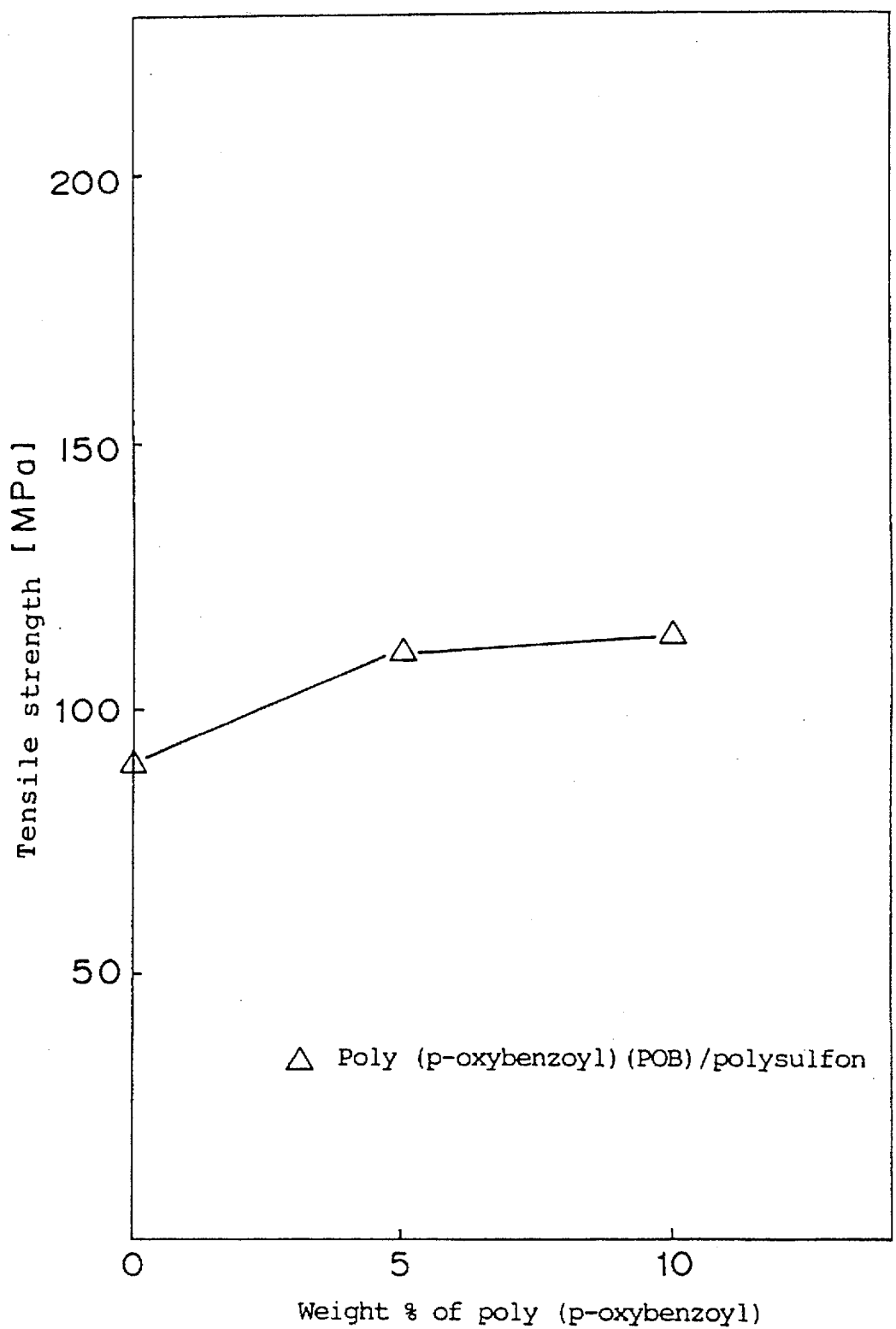
FIG. 11 is a graph to show the composition dependence for tensile strength of rigid polymer composite of Example 5.
Figure 12:
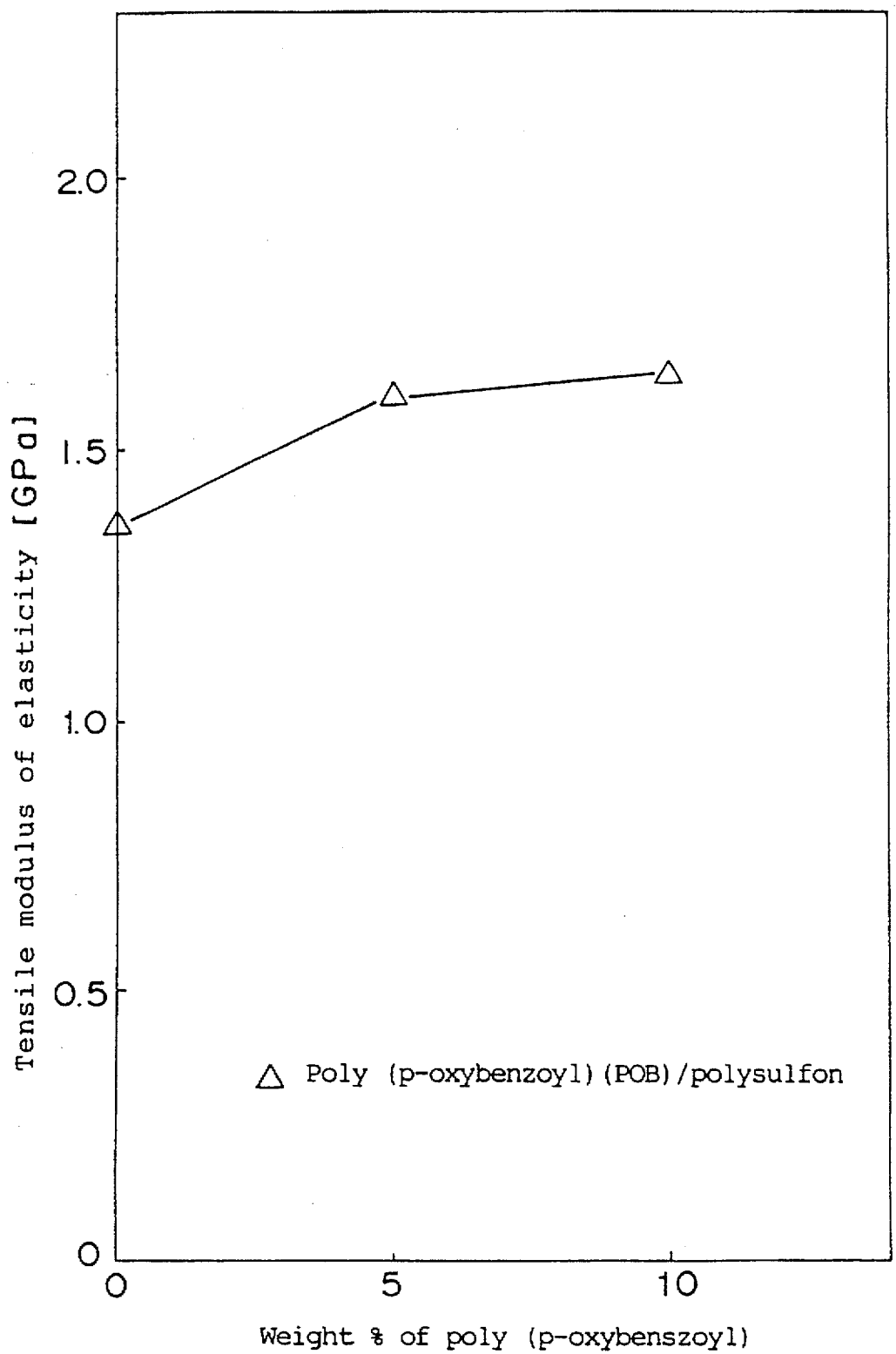
FIG. 12 is a graph to show the composition dependence of tensile modulus of elasticity of rigid polymer composite of Example 5.

Tensile test was conducted on the composite, FIG. 11 and FIG. 12 indicating the tensile strength and tensile modulus of elasticity.

Measurement of physical strength was conducted by molding the composite and the polysulfon into round dumbbell piece (tensile test) by MINI-MAX molder CS-183 MMX, Custom Scientific Instruments Inc. at resin temperature of 310° C. and metal mold temperature of 180° C. Tensile test was conducted in the same way as in Example 2.

As it is evident from the above results, by the molecular level dispersion of poly(p-oxybenzoyl), strength and modulus of elasticity of polysulfon drastically improved.

What is claimed is:

1. A process for producing a rigid polymer composite composed of flexible thermoplastic polymer matrix and rod-shaped reinforcing members finely dispersed therein at a molecular level, comprising the steps of:

providing a melt of at least one flexible thermoplastic polymer and precursors to at least one rigid rod polymer, wherein said melt does not contain a solvent; and polymerizing said precursors in said melt at an apparent maximum shear rate that is effective to provide a rigid polymer composite having rod-shaped reinforcing members having cross sectional diameters of sections cut at a right angle to the longitudinal direction of said rod-shaped reinforcing members less than 0.07 μm.

2. The process for producing a rigid polymer composite as defined in claim 1, wherein said step of polymerizing is conducted at an apparent maximum shear rate within a range of 2.0 to 15 sec$^{-1}$.

3. The process for producing a rigid polymer composite as defined in claim 1, wherein the flexible thermoplastic polymer is selected from the group consisting of polyethylene terephthalate, nylon-6, nylon-66, polysulfones, polycarbonates, and polybutylene terephthalate.

4. The process for producing a rigid polymer composite as defined in claim 1, wherein the precursor in the polymerization step is polymerized to form a polymer having a repetitive unit structure —Ar(X)$_n$Ar'—, wherein Ar is

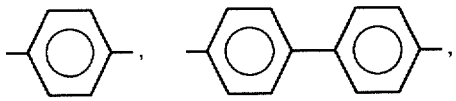

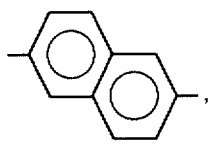

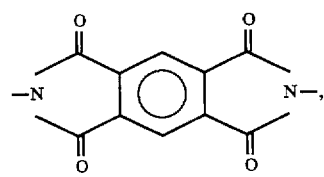

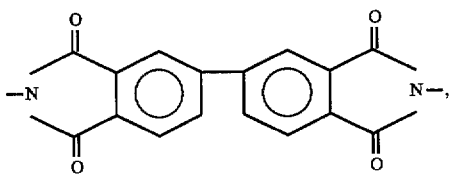

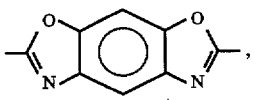

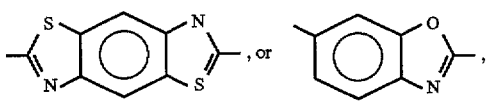

Ar' is

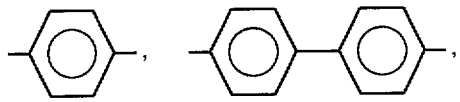

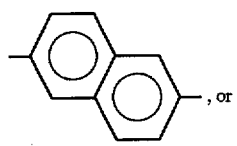

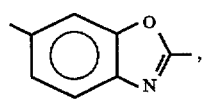

X is —CH=N—, —COO—, —N=N(O)—, —CONH—, —N=N—, —C=C— or —CH=CH—, and n is zero or 1.

5. The process for producing a rigid polymer composite as defined in claim 2, wherein the flexible thermoplastic polymer is selected from the group consisting of polyethylene terephthalate, nylon-6, nylon-66, polysulfones, polycarbonates, and polybutylene terephthalate.

6. The process for producing a rigid polymer composite as defined in claim 2, wherein the precursor in the polymerization step is polymerized to form a polymer having a repetitive unit structure —Ar(X)$_n$Ar'—, wherein Ar is

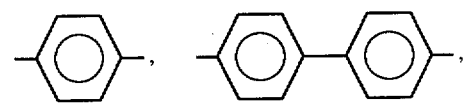

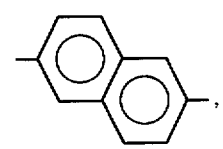

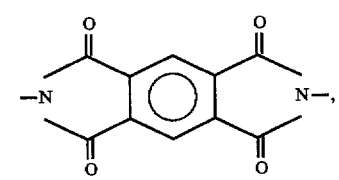

-continued

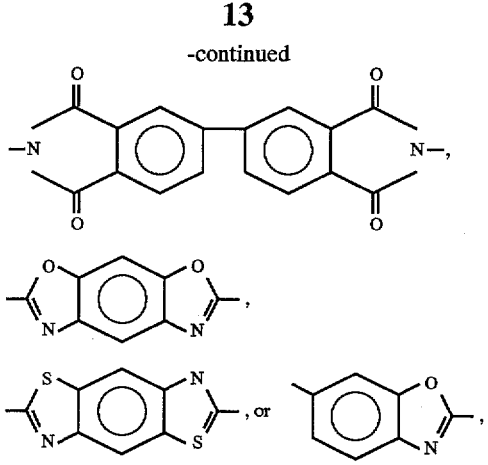

Ar' is

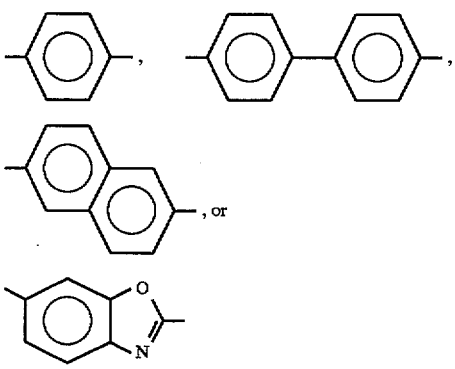

X is —CH=N—, —COO—, —N=N(O)—, —CONH—, —N=N—, —C≡C— or —CH=CH—, and n is zero or 1.

7. The process for producing a rigid polymer composite as defined in claim 1,
wherein the maximum apparent shear rate, measured by a rotor type miniature shearing equipment having a rotating piston with a flat lower surface and an upper surface enclosed in a fixed cylinder with a flat inside bottom surface, the flat lower surface of the piston being parallel to the flat inside bottom surface of the cylinder, is defined by the formula $\delta = 2\pi r\omega/G$,
where $\delta$ is the maximum apparent shear rate, r is the radius of the inside of the cylinder, $\omega$ is the angular velocity and G is the thickness of the polymer composite inside of the cylinder.

8. The process for producing a rigid polymer composite as defined in claim 2,
wherein the maximum apparent shear rate, measured by a rotor type miniature shearing equipment having a rotating piston with a flat lower surface and an upper surface enclosed in a fixed cylinder with a flat inside bottom surface, the flat lower surface of the piston being parallel to the flat inside bottom surface of the cylinder, is defined by the formula $\delta = 2\pi r\omega/G$,
where $\delta$ is the maximum apparent shear rate, r is the radius of the inside of the cylinder, $\omega$ is the angular velocity and G is the thickness of the polymer composite inside of the cylinder.

9. The process for producing a rigid polymer composite as defined in claim 1,
wherein the precursor is p-acetoxybenzoic acid, and the ratio of precursor to flexible thermoplastic polymer provided to the polymerization is 5–20 parts by weight of precursor to 100 parts by weight of flexible thermoplastic polymer.

10. The process for producing a rigid polymer composite as defined in claim 2,
wherein the precursor is p-acetoxybenzoic acid, and the ratio of precursor to flexible thermoplastic polymer provided to the polymerization is 5–20 parts by weight of precursor to 100 parts by weight of flexible thermoplastic polymer.

11. The process for producing a rigid polymer composite as defined in claim 1, wherein the precursor in the polymerization step is polymerized to form a polymer selected from the group consisting of poly(p-oxybenzoyl), poly(p-benzamide), poly(m-phenylene isophthalamide), poly(p-phenylene terephthalamide), polyazomethyne, poly(p-phenylene pyromellitimide), polybenzobisoxazol, polybenzobisthiazol, polybenzoxazol and poly(p-phenylene benzobisthiazol).

12. The process for producing a rigid polymer composite as defined in claim 2, wherein the precursor in the polymerization step is polymerized to form a polymer selected from the group consisting of poly(p-oxybenzoyl), poly(p-benzamide), poly(m-phenylene isophthalamide), poly(p-phenylene terephthalamide), polyazomethyne, poly(p-phenylene pyromellitimide), polybenzobisoxazol, polybenzobisthiazol, polybenzoxazol and poly(p-phenylene benzobisthiazol).

13. The process for producing a rigid polymer composite as defined in claim 1, wherein said polymerizing is conducted at an apparent maximum shear rate within a range of 2.0 to 25 $\sec^{-1}$.

14. The process for producing a rigid polymer composite as defined in claim 1, wherein the flexible thermoplastic polymer is a polyether sulfone.

15. The process for producing a rigid polymer composite as defined in claim 2, wherein the flexible thermoplastic polymer is a polyether sulfone.

* * * * *